United States Patent [19]

Saito

[11] Patent Number: 5,412,520
[45] Date of Patent: May 2, 1995

[54] TRACKING CONTROL WHICH AVOIDS LOCK-UP FOR ROTARY HEAD REPRODUCING APPARATUS AND WHICH SENSES WHETHER A TRUCKING CONTROL SIGNAL IS ABSENT FOR A PREDETERMINED TIME

[75] Inventor: Isao Saito, Kanagawa, Japan

[73] Assignee: Sony Corporation, Tokyo, Japan

[21] Appl. No.: 132,358

[22] Filed: Oct. 6, 1993

Related U.S. Application Data

[63] Continuation-in-part of Ser. No. 29,583, Mar. 11, 1993.

[30] Foreign Application Priority Data

Oct. 6, 1992 [JP] Japan ..................... 4-267559

[51] Int. Cl.$^6$ .................. G11B 5/58; G11B 5/584; G11B 15/14; G11B 15/46
[52] U.S. Cl. ................... 360/77.15; 360/77.13; 360/64; 360/73.07
[58] Field of Search .............. 360/73.07, 77.14, 75, 360/77.15, 77.13, 70, 71, 51, 64, 73.06, 77.08, 10.1

[56] References Cited

U.S. PATENT DOCUMENTS

| | | | |
|---|---|---|---|
| 4,191,978 | 3/1980 | Furumoto et al. | 360/75 |
| 4,539,603 | 9/1985 | Takeuchi et al. | 360/10.1 |
| 4,558,382 | 12/1985 | Edakubo et al. | 360/77.15 |
| 4,630,146 | 12/1986 | Takayama et al. | 360/77.08 |
| 4,636,882 | 1/1987 | Edakubo et al. | 360/77.15 |
| 4,755,893 | 7/1988 | Yamada et al. | 360/77.15 |
| 4,782,405 | 11/1988 | Imai | 360/73.06 |
| 4,843,493 | 6/1989 | Furuhata et al. | 360/77.15 |
| 5,095,394 | 3/1992 | Yanagihara | 360/77.14 |
| 5,109,305 | 4/1992 | Ohsawa et al. | 360/64 |
| 5,233,488 | 8/1993 | Yanagihara | 360/77.15 |

FOREIGN PATENT DOCUMENTS

| | | |
|---|---|---|
| 0458531 | 11/1991 | European Pat. Off. . |
| 0459732 | 12/1991 | European Pat. Off. . |
| 0560367 | 9/1993 | European Pat. Off. . |

*Primary Examiner*—Patrick Wamsley
*Attorney, Agent, or Firm*—William S. Frommer; Alvin Sinderbrand

[57] ABSTRACT

In rotary head reproducing apparatus of the type having heads which scan successive tracks on a record medium that is movable at a controllable speed, wherein such tracks contain a pattern of tracking control signals that are used by a servo control arrangement to determine and correct tracking errors, at least one of the tracking control signals that are reproduced from the tracks is detected, and if that tracking control signal is not sensed for a predetermined time interval, the speed at which the record medium is driven is changed to a predetermined speed (e.g. greater or less than the normal speed), thereby forcing tracking errors. This prevents lock-up which could occur when the tracks which are scanned by the heads are precisely out-of-phase from the correct tracks.

16 Claims, 6 Drawing Sheets

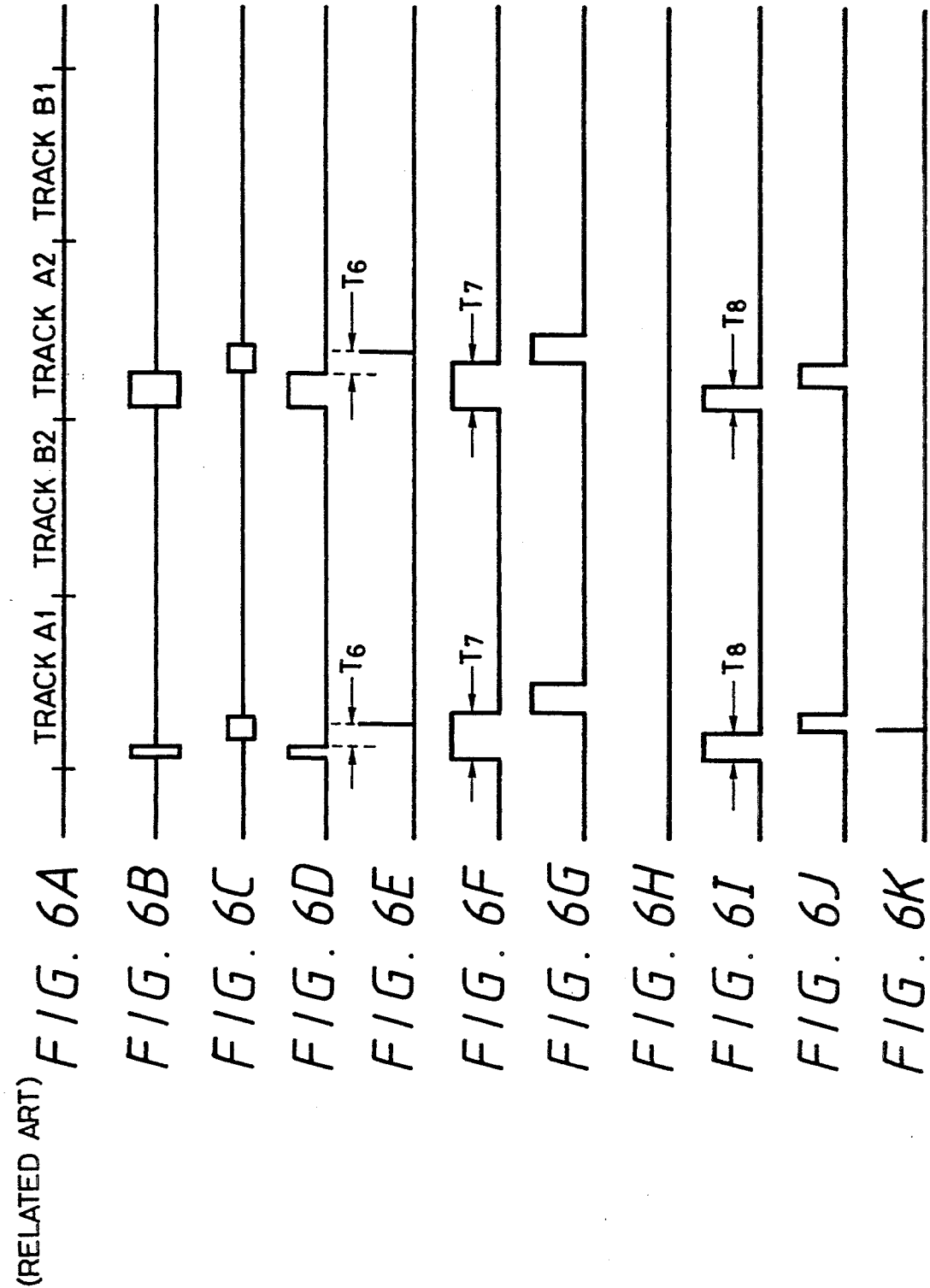

TRACKING CONTROL WHICH AVOIDS LOCK-UP FOR ROTARY HEAD REPRODUCING APPARATUS AND WHICH SENSES WHETHER A TRUCKING CONTROL SIGNAL IS ABSENT FOR A PREDETERMINED TIME

This is a continuation-in-part of application Ser. No. 08/029,583 filed Mar. 11, 1993, now allowed.

BACKGROUND OF THE INVENTION

This invention relates to rotary head reproducing apparatus, such as the type normally used in video or digital audio tape recording, and, more particularly, to such apparatus that is provided with automatic track following (ATF) and which prevents possible lock-up in the event that ATF control locks onto the wrong tracks.

It is known that to record a greater amount of information onto a record medium, such as a magnetic tape, the density with which the information is recorded must be increased. As a result, the tracks in which such information is recorded are made quite narrow. Hence, rotary head recording apparatus, such as analog and digital video tape recorders, digital audio tape recorders and digital data recorders operate to record information in slant tracks having reduced track pitch.

For proper reproduction of the information which is recorded in slant tracks on, for example, a magnetic tape, servo control arrangements have been developed to assure that the rotary heads which are used to scan tracks which have been previously recorded are brought into proper alignment with those tracks. For example, in video tape recorders, it had been common to record a longitudinal "control" track CTL with information which was used as a servo reference signal to effect a servo control over the movement of the tape such that the rotary heads were centered on the respective tracks scanned thereby. While the use of such a CTL track servo control arrangement was effective to obtain proper scanning of tracks having a relatively wide pitch, an improved technique was desirable to provide the improved precision needed for accurate track following of tracks having a relatively narrow pitch.

Accordingly, an automatic track following arrangement has been developed in which tracking control signals are recorded in the information tracks themselves (i.e. in the same slant tracks in which the video, audio or data signals are recorded) and these tracking control signals are reproduced by the rotary heads and used to detect and correct tracking errors as those heads scan the tracks. For example, the tracking control signals may take the form of a pilot signal admitting of a particular frequency that is separate and distinct from the frequencies associated with the recorded information. Tracking errors are determined as a function of the signal level of the reproduced pilot signal. In one proposal, the pilot signal is recorded in a particular track pattern in respective areas of each track. For example, a track may be provided with an ATF area at the beginning portion thereof, referred to as the "head entering region" and may be arranged in a particular pattern to facilitate detection thereof.

A rotary head assembly generally is arranged with heads exhibiting respectively different azimuth angles so that when a head scans a track in which signals had been recorded with the same azimuth angle as that head, crosstalk signals that may be picked up from adjacent tracks and which were recorded with different azimuth angles exhibit reduced signal levels because of the phenomenon known as azimuth loss. Nevertheless, pilot signals which are recorded in those adjacent tracks and which are picked up as crosstalk components may be sufficiently detected, and the relative levels of those crosstalk pilot signals are used to determine whether the head is properly centered on the track then being scanned thereby.

In copending U.S. patent application Ser. No. 08/029,583, filed Mar. 11, 1993, and assigned to the assignee of the instant invention, various pilot signal patterns are discussed. For example, pilot signals of two different frequencies are recorded in alternate tracks with the pilot signal of one frequency being used as an identification signal from which a sampling pulse is derived, and the pilot signal of the other frequency being used as a tracking detection signal whose level is sampled by the aforementioned sampling pulse. Tracking errors are sensed by comparing the relative levels of the sampled tracking detection signals which are picked up as crosstalk components when alternate tracks are scanned.

In another ATF arrangement discussed in the aforementioned copending application, identification signals are recorded in alternate tracks and the tracking detection signal is recorded in only alternate ones of the remaining tracks. In this arrangement, the track pattern repeats itself every four tracks with one-out-of-four of these tracks having neither identification nor detecting signals recorded therein. After these four tracks are scanned, the displacement, or tracking error, of the heads relative to the tracks scanned thereby is detected as a function of the sampled crosstalk component that is picked up when the track containing the identification signal is scanned.

Effective tracking control is obtained from the aforementioned as well as other pilot signal patterns that are recorded in ATF areas located in the vicinities of the beginning and ending portions of the tracks (commonly referred to, as aforesaid, as the head-entering and head-leaving regions of the tracks). Although the identification and tracking detection signals are recorded as distinguishable pilot frequencies, other suitable identifying characteristics can be used to permit the discrimination of identification and detection signals from other information recorded in the tracks and to permit the distinguishing of identification signals from detection signals. For example, the respective signals may exhibit different data patterns, ID portions, or the like.

While the ATF operation which uses the aforementioned pattern of tracking control signals generally provides accurate tracking error correction, it has been found that, if a head of one azimuth angle is in proper alignment with a track that had been recorded by a head of a different azimuth angle, that is, if the heads scan tracks which are one track pitch out-of-phase, the ATF operation may result in "lock-up" of this out-of-phase relationship for a prolonged period of time. For example, such lock-up may remain for up to about 1.5 seconds until the ATF control circuitry recovers the proper tracking condition. If the rotary head apparatus is incorporated into, for example, a video reproducing device, and if that video reproducing device inhibits a video signal from being supplied as an output signal until the proper ATF condition is obtained, this may result in the reproduction of a "blank" video picture which, in turn, may lead a user of the device to conclude that the device has failed.

OBJECTS OF THE INVENTION

Therefore, it is an object of the invention to provide an improved ATF technique which overcomes the aforenoted problem.

Another object of this invention is to prevent or at least minimize an out-of-phase "lock-up" that could arise when rotary heads scan slant tracks that differ by one track pitch from the slant tracks which should be scanned.

A further object of this invention is to provide an ATF arrangement in rotary head reproducing apparatus in which the possibility of out-of-phase lock-up is detected promptly to initiate corrective action quickly.

It is an additional object of this invention to provide an ATF arrangement in rotary head reproducing apparatus, such as in a video playback device, such that a video picture may be reproduced and displayed promptly after a playback operation is initiated, even if the rotary heads initially scan record tracks that are out-of-phase by one track pitch.

Various other objects, advantages and features of the present invention will become readily apparent from the ensuing detailed description, and the novel features will be particularly pointed out in the appended claims.

SUMMARY OF THE INVENTION

In accordance with this invention, rotary head apparatus is provided with at least one pair of rotary heads which scan successive tracks on a record medium that is movable at a controllable speed, which tracks contain a pattern of tracking control signals for use in determining tracking errors. A servo control arrangement is responsive to the reproduced tracking control signals to carry out a tracking control operation which minimizes such tracking errors. At least one of the tracking control signals reproduced by the rotary heads is detected; and if this one tracking control signal is absent for a predetermined time interval, the servo control arrangement is supplied with a speed determining signal which changes the speed of the record medium so as to force the occurrence of tracking errors. Thereafter, the forced tracking errors are used to recover proper tracking control of the heads relative to the tracks scanned thereby; and the speed of movement of the record medium is returned to its proper, controlled speed.

As one aspect of this invention, the speed determining signal admits of a predetermined level and is supplied to the servo control arrangement for a preselected duration, thereby increasing or decreasing the speed at which the record medium is driven for that duration.

As a feature of this invention, a determination of whether the tracking control signal is reproduced is made by detecting whether the level of that tracking control signal exceeds a pre-established threshold level. It is expected that, if a head having an azimuth angle which differs from the azimuth angle with which the tracking control signal was recorded is, nevertheless, in proper alignment with the track which contains that tracking control signal, the reproduced signal level will be less than the pre-established threshold.

BRIEF DESCRIPTION OF THE DRAWINGS

The following detailed description, given by way of example, will best be understood in conjunction with the accompanying drawings in which:

FIGS. 6A–6K represent timing waveforms which are useful in understanding the operation of the ATF arrangement shown in FIG. 5.

DETAILED DESCRIPTION OF A PREFERRED EMBODIMENT.

Figure 4:
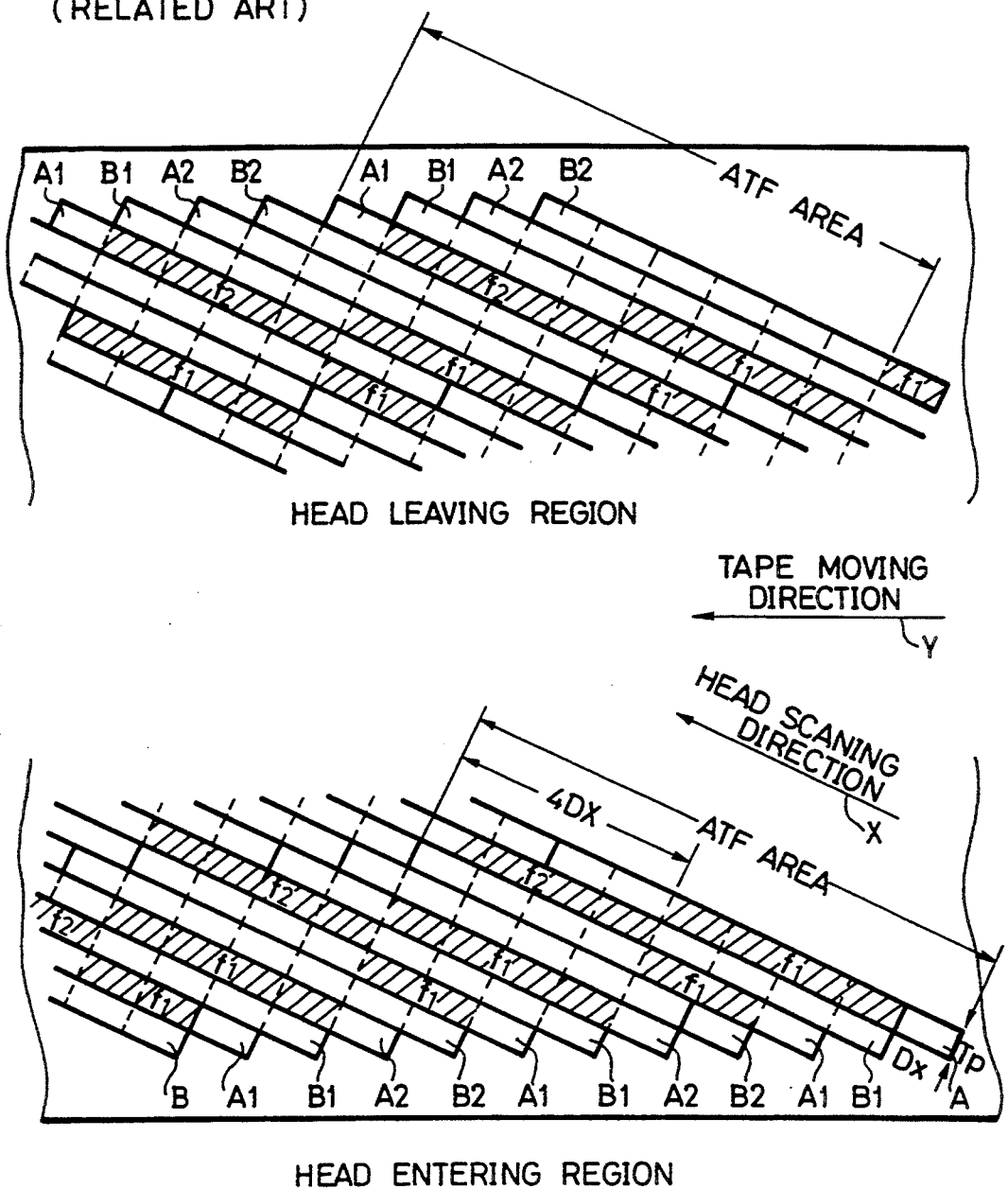
FIG. 4 is a schematic representation of the pattern of tracking control signals with which the present invention is used.

Before describing the present invention, reference first is made to FIG. 4 which illustrates a preferred pattern of tracking control signals that are recorded in the ATF areas disposed at the head-entering region and the head-leaving region of slant tracks which are recorded on, for example, a record tape by rotary head recording apparatus. It will be appreciated that the rotary head recording apparatus may be a video tape recorder of analog or digital form, a digital audio tape recorder or a digital data recorder. For the purpose of understanding the present invention, the nature of the information signals recorded in the respective slant tracks designated A, B, A, B, . . . , etc., is not important. Furthermore, and for convenience, it is assumed that the tracking control signals are recorded as pilot signals of different frequencies $f_1$ and $f_2$. However, the tracking control signals may exhibit other characteristics which permit ready discrimination thereof from each other as well as from the information signals that are recorded in the major portion of the tracks. For example, the tracking control signals may exhibit digital data patterns or may include ID headers or other ID information which permits such discrimination.

The pattern of tracking control signals shown in FIG. 4 repeats itself every four tracks. Hence, for convenience, the slant tracks may be identified as tracks A1, B1, A2, B2, A1, B1, etc., as illustrated. Furthermore, tracking control signals which admit of pilot frequency $f_1$ may be thought of as identifying signals for a purpose soon to be described; and tracking control signals which admit of pilot frequency $f_2$ may be thought of as tracking detection signals. In the illustrated embodiment, identifying signals of pilot frequency $f_1$ are recorded in tracks A1, A2, A1, A2 . . . and detection signals of pilot frequency $f_2$ are recorded in tracks B1. No pilot signals are recorded in tracks B2 in the ATF area at the head-entering region. The pilot signals which are recorded in the ATF area at the head-leaving region are similar to those recorded in the head-entering region, with the following notation: the pilot signals recorded in tracks A1 at the head-entering region are recorded in tracks B1 at the head-leaving region, and vice versa; and the pilot signals recorded in tracks A2 and B2 at the head-entering region are reversed in the head-leaving region. For convenience, and to avoid unnecessary confusion, the following description is limited to the tracking control signals recorded in the ATF area at the head-entering region.

The beginning of a track is offset in the longitudinal direction of that track from its adjacent, preceding track by a distance Dx. As is clearly seen in FIG. 4, pilot signals are not recorded in this beginning length Dx. Similarly, at the head-leaving region, pilot signals are not recorded in the final length Dx. With reference to the head-entering region, the identifying signals of pilot frequency $f_1$ are spaced from the beginning of tracks A1, A2 by this distance Dx. Pilot signal $f_1$ is recorded over the length 2Dx in tracks A1; and pilot signal $f_1$ is recorded over a length 4Dx in tracks A2. The detection signal of pilot frequency $f_2$ is recorded in tracks B1 over a length 4Dx, and the beginning of this pilot signal is spaced from the start of track B1 by the distance 4Dx. Accordingly, the positioning of pilot signal $f_2$ with respect to pilot signal $f_1$ recorded in tracks A1 and A2 adjacent thereto is such that the pilot signal $f_2$ begins at the location whereat the pilot signal $f_1$ ends.

The pattern of the pilot signals recorded in the ATF area at the head-leaving region is seen to be the reverse of the pattern recorded at the head-entering region. Hence, the ATF circuit which is used to effect proper track following control at the head-entering region may be used without modification to effect proper track following at the head-leaving region, as will become apparent from the following description.

It will be recognized that the signals recorded in tracks A1, A2, A1, A2, etc. are recorded by a head or heads exhibiting the same azimuth angle; and for convenience such head or heads is referred to simply as head A. Likewise, the signals recorded in tracks B1, B2, B1, B2, etc., are recorded by a head or heads whose azimuth angle differs from that of head A and, also for convenience, is referred to simply as head B. The frequencies $f_1$ and $f_2$ of the pilot signals are selected such that they do not interfere with other useful information recorded in the tracks and, moreover, are such that a pilot signal recorded by head A nevertheless may be picked up by head B, although with reduced signal level. For example, when head A scans track A2, the pilot signal of frequency $f_2$ recorded in track B1 nevertheless will be picked up by head A as a crosstalk component. Similarly, when A scans track A1, the pilot signal of frequency $f_2$ recorded in track B1 will be picked up as a crosstalk component. Automatic track following is carried out as a function of the comparison of the signal level of pilot signal $f_2$ that is picked up as the crosstalk component when tracks A1 and A2 are scanned.

Figure 5:
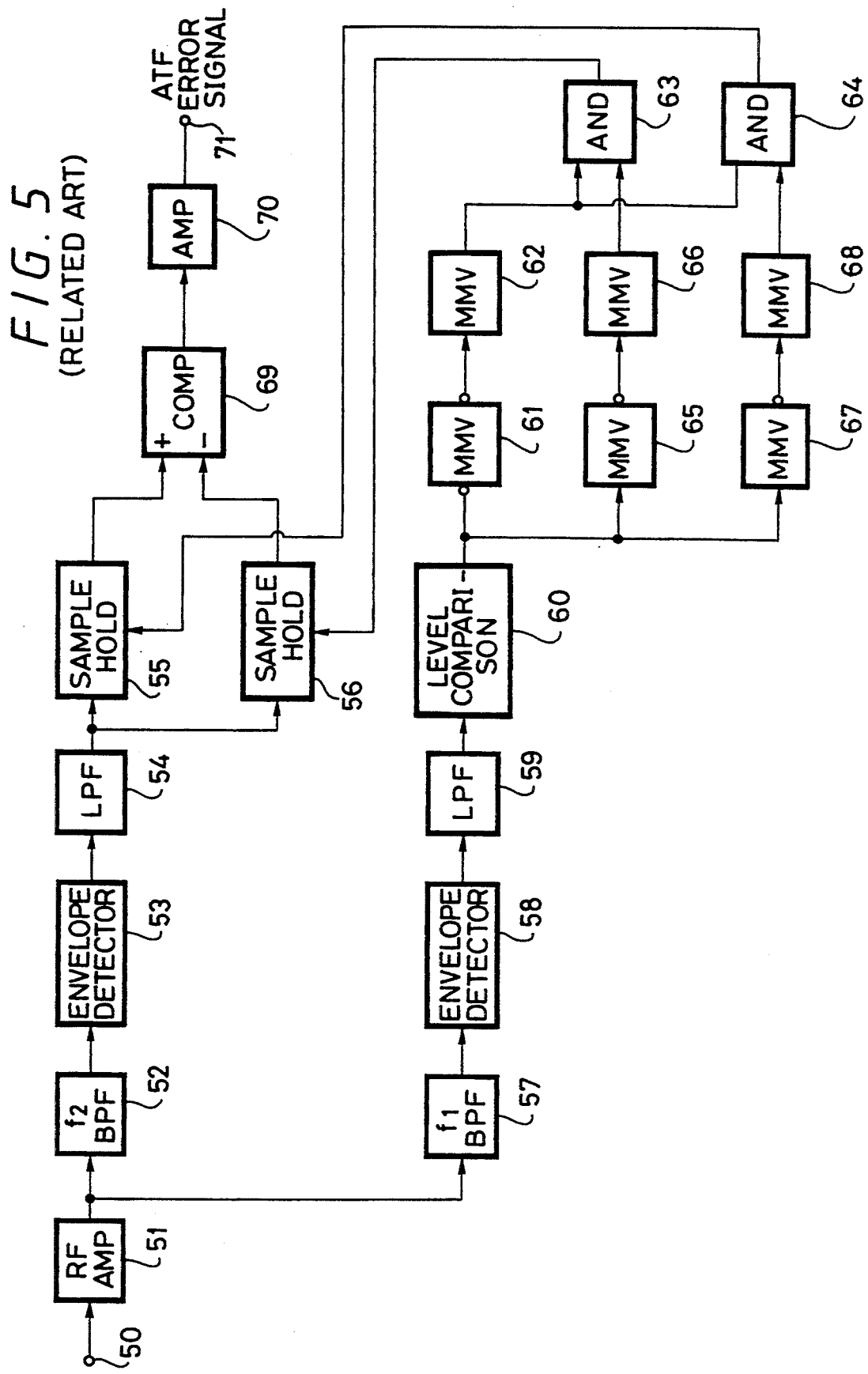
FIG. 5 is a block diagram of an ATF arrangement which cooperates with the pattern shown in FIG. 4 to effect proper track following.

FIG. 5 is a block diagram of an ATF control circuit that may be used in conjunction with the pilot signal pattern illustrated in FIG. 4. The ATF circuit includes a detection signal channel by which the detection signal of pilot frequency $f_2$ is detected and sampled; and an identification signal channel by which the identification signal of pilot frequency $f_1$ is detected and from which sampling pulses are generated. The detection signal channel includes a bandpass filter 52, an envelope detector 53, a low pass filter 54 and sample-and-hold circuits 55 and 56. Bandpass filter 52 is coupled to an input terminal 50 by way of an RF amplifier 51 and is adapted to extract detection signals of pilot frequency $f_2$ which are reproduced by the rotary heads which scan the tracks illustrated in FIG. 4 and which are supplied to input terminal 50. It will be appreciated that pilot signal $f_2$ is reproduced and extracted as a crosstalk component when, for example, head A scans tracks A1 and A2 and picks up pilot signal $f_2$ from adjacent track B1. Pilot signal $f_2$ also is extracted when head B scans track B1; although, as will become apparent from the ensuing description, the extraction of pilot signal $f_2$ from track B1 when head B scans this track is not utilized by the AFT circuit.

The output of bandpass filter 52 is coupled to envelope detector 53 which produces a signal whose amplitude varies with the envelope of the extracted pilot signal $f_2$, and the output of the envelope detector is coupled to sample-and-hold circuits 55 and 56 by low pass filter 54. Hence, it is seen that a signal representing the level of pilot signal $f_2$ is supplied to these sample-and-hold circuits.

The identification signal channel is comprised of a bandpass filter 57, an envelope detector 58, a low pass filter 59, a level comparison circuit 60 and a sampling pulse generator. Bandpass filter 57 is coupled to input terminal 50 by way of RF amplifier 51 and, similar to the operation of bandpass filter 52, is adapted to extract the identification signal of pilot frequency $f_1$ from those signals which are reproduced by the rotary heads. Accordingly, the pilot signal $f_1$ is extracted when head A scans tracks A1 and A2; and this pilot signal also is extracted when head B scans tracks B1 and B2 and picks up pilot signal $f_1$ as a crosstalk component from adjacent tracks A1 and A2. As will become apparent, the extraction of pilot signal $f_1$ when head B scans tracks B1 and B2 is not used for the ATF operation.

Envelope detector 58, which may be similar to envelope detector 53, is coupled to the output of bandpass filter 57 to produce a signal which represents the envelope, or signal level, of pilot signal $f_1$. The pilot signal envelope level is coupled to level comparison circuit 60 by low pass filter 59. Level comparison circuit 60 may, for example, comprise a threshold circuit which determines if the signal level of the pilot signal $f_1$, as represented by the envelope thereof, exceeds a preestablished threshold level. It is appreciated that if head A scans tracks A1 or A2, even if a tracking error is present therein, the signal level of pilot signal $f_1$ will exceed the threshold. The level comparison circuit functions to shape the extracted pilot signal $f_1$ to a rectangular pulse which undergoes a positive transition when the pilot signal first is reproduced and undergoes a negative transition at the end of the pilot signal.

The sampling pulse generator is comprised of a delayed pulse generator formed of monostable multivibrator circuits 61 and 62 (for convenience, the monostable multivibrator circuit is referred to herein as a multivibrator or as MMV), a window generator formed of multivibrators 65 and 66 and yet another window generator formed of multivibrators 67 and 68. Multivibrator 61 is responsive to a negative transition in the output signal produced by level comparison circuit 60 and exhibits a time-out period $T_6$ which, for example, may correspond to the distance 2Dx ($T_6 = 2Dx$). At the conclusion of this time-out period, multivibrator 61 produces an output transition which triggers multivibrator 62 to produce an output pulse of narrow duration. This output pulse is coupled in common to AND gates 63 and 64 and functions as a sampling pulse.

Multivibrator 65 of the first-mentioned window generator is responsive to a positive transition in the output of level comparison circuit 60 to produce an output pulse of predetermined duration $T_7$. At the conclusion of this output pulse, the negative transition therein triggers multivibrator 66 to supply an enabling pulse to AND gate 63; and if the sampling pulse produced by multivibrator 62 is present during the duration of this enable pulse, AND gate 63 couples the sampling pulse to sample-and-hold circuit 56. As will be discussed below, AND gate 63 is operative to supply a sampling pulse when tracks A2 are scanned.

Multivibrator 67 of the second-mentioned window generator exhibits a time-out period $T_8$ and is responsive to a positive transition in the output of level comparison circuit 60 to produce a pulse of duration $T_8$. This pulse is coupled to multivibrator 68 which responds to a negative transition therein to supply an enabling pulse to AND gate 64. The enabling pulse produced by multivibrator 68 may be of the same duration as the enabling pulse produced by multivibrator 66. If the sampling pulse produced by multivibrator 62 is present when multivibrator 68 supplies its enabling pulse to AND gate 64, the sampling pulse is supplied by this AND gate to sample-and-hold circuit 55. It will be appreciated from the description set out below that sampling pulses are supplied to sample-and-hold circuit 55 by AND gate 64 when head A scans tracks A1.

The outputs of sample-and-hold circuits 55 and 56 are coupled to a comparator 69 which produces an output signal of polarity and magnitude depending upon the difference between the sampled pilot signal $f_2$ supplied thereto by the sample-and-hold circuits. This difference, after being amplified by an amplifier 70, is coupled to an output terminal 71 as an ATF error signal. As will be discussed below, if the alignment of the heads is offset from track center in the upward direction, as viewed in FIG. 4, comparator 69 produces an ATF error signal of positive magnitude. This ATF error signal, as will be described, adjusts the speed at which the record tape is driven, thereby having the effect of shifting the heads in the downward direction such that they are brought into alignment with the tracks. Conversely, if the alignment of the heads is offset from the center of the tracks in the downward direction, as seen in FIG. 4, the ATF error signal produced by comparator 69 exhibits a negative polarity, whereupon the tape speed is adjusted in a manner which tends to shift the heads relative to the tracks in the upward direction, thereby restoring proper tracking alignment.

The manner in which the ATF control circuit illustrated in FIG. 5 operates now will be described in conjunction with the timing waveforms shown in FIGS. 6A–6K. FIG. 6A represents the successive tracks in the ATF area disposed in the head-entering region, as shown in FIG. 4, which are scanned successively. Let it be assumed that a head with an azimuth angle equal to the azimuth angle with which signals are recorded in tracks A1, A2, A1, A2, etc. scans track A1 and the same or a similar head scans track A2. Likewise, let it be assumed that tracks B1, B2, B1, B2, etc. are scanned by a head or heads having an azimuth angle substantially equal to the azimuth angle of the signals recorded in these tracks. FIG. 6B illustrates the output of envelope detector 58; and it is seen that when head A scans track A1, pilot signal $f_1$ of an interval $2Dx$ is recovered; and when head A scans track A2, pilot signal $f_1$ having an interval $4Dx$ is recovered.

FIG. 6C illustrates the output of envelope detector 53; and it is seen that after head A scans pilot signal $f_1$ in track A1, pilot signal $f_2$ in adjacent track B1 is picked up as a crosstalk component for an interval $4Dx$. Likewise, after head A reproduces pilot signal $f_1$ from track A2, pilot signal $f_2$ is picked up as a crosstalk component from adjacent track B1 for the interval $4Dx$.

The output of level comparison circuit 60 is illustrated in FIG. 6D, and it is assumed herein that the envelope of the pilot signal $f_1$ exceeds the threshold level of that level comparison circuit. When track A1 is scanned, the negative transition in the output of the level comparison circuit (FIG. 6D) triggers multivibrator 61; and at the completion of the time-out period $T_6$ thereof, the output of multivibrator 61 triggers multivibrator 62 to produce the sampling pulse shown in FIG. 6E. Since $T_6=2Dx$, the sampling pulse which is produced by multivibrator 62 when track A1 is scanned coincides with the middle of the interval in which pilot signal $f_2$ is recorded in track B1.

FIG. 6E also illustrates the timing relationship between the sampling pulse produced by multivibrator 62 when track A2 is scanned and the pilot signal $f_2$ picked up from adjacent track B1. That is, the sampling pulse produced when track A1 is scanned is seen to coincide substantially with the middle of the interval during which pilot signal $f_2$ is present.

FIG. 6F illustrates the generation of a window pulse by multivibrator 65 admitting of a window duration $T_7$. This window pulse is generated in response to the positive transition in the output of level comparison circuit 60 when track A1 or A2 is scanned. At the completion of this window pulse, multivibrator 66 is triggered to produce the enabling pulse shown in FIG. 6G. AND gate 63 is enabled by the enabling pulse of FIG. 6G; and if a sampling pulse produced by multivibrator 62 is present during this enabling interval, sample-and-hold circuit 56 samples the envelope of pilot signal $f_2$.

Similarly, multivibrator 67 is triggered by the positive transition in the output of level comparison circuit 60 to produce a window pulse of duration $T_8$, as shown in FIG. 6I. It is seen that $T_8 < T_7$. At the completion of the window pulse of duration $T_8$, multivibrator 68 is triggered to supply the enabling pulse shown in FIG. 6J to AND gate 64. If the sampling pulse produced by multivibrator 62 and shown in FIG. 6E is present during this enabling pulse duration, AND gate 64 supplies the sampling pulse to sample-and-hold circuit 55 which, in turn, samples the envelope of pilot signal $f_2$.

It is seen from FIGS. 6F–6K that, when track A1 is scanned, the enabling pulse produced by multivibrator 68 is delayed from the beginning of pilot signal $f_1$ so as to coincide with the sampling pulse produced by multivibrator 62 at the mid-portion of pilot signal $f_2$. However, when track A1 is scanned, the window pulse produced by multivibrator 65 delays the occurrence of the enabling pulse from multivibrator 66 as to occur at a time well after the sampling pulse was generated. Consequently, when track A1 is scanned, AND gate 64 is enabled to supply a sampling pulse to sample-and-hold circuit 55 which, in turn, supplies to comparator 69 a sampled envelope level of pilot signal $f_2$, thereby representing the proximity of head A to track B1.

When track A2 is scanned, the window pulse period $T_7$ produced by multivibrator 65 is sufficient to coincide the enabling pulse from multivibrator 66 with the sampling pulse generated by multivibrator 62. Conversely, the duration $T_8$ of the window pulse produced by multivibrator 67 is too narrow to position the enabling pulse from multivibrator 68 in coincidence with the sampling pulse. Hence, when track A2 is scanned, AND gate 64 is enabled before the sampling pulse is generated; but AND gate 63 is enabled at a time sufficient to pass the sampling pulse to sample-and-hold circuit 56. Consequently, when track A2 is scanned, comparator 69 is supplied with a sample of the envelope of pilot signal $f_2$.

When the heads operate in a precise track-following mode, the respective samples supplied to comparator 69 are equal and the ATF error signal is approximately zero. The polarity of the ATF error signal indicates the direction of misalignment, or offset, of the heads and the magnitude of the ATF error signal corresponds to the magnitude of such misalignment. A servo circuit, to be described, responds to the ATF error signal to adjust the speed at which the record tape is driven and this, in turn, restores the heads to their proper track following relationship.

Proper ATF operation of the circuit shown in FIG. 5 occurs when head A scans tracks A1 and A2 and head B scans tracks B1 and B2, even if these heads exhibit substantial tracking errors with respect to the tracks scanned thereby. It is possible, however, that head A may scan track B1 or B2 and head B may scan track A1 or A2. Should this be the case, because of azimuth loss, the pilot signal $f_1$ picked up by head B when track A1 or A2 is scanned may exhibit a signal level such that the envelope supplied to level comparison circuit 60 is less than the pre-established threshold level therein. Consequently, AND gates 63 and 64 will not supply sampling pulses to sample-and-hold circuits 55 and 56. As a result, a substantially zero ATF error signal may be produced at output terminal 71. Hence, when the heads exhibit a tracking error substantially equal to one track pitch, ATF error correction is not initiated promptly; and as mentioned above, it may take a substantial period of time before this tracking error condition is detected and corrected.

Stated otherwise, the ATF error signal which is produced at output terminal 71 when the tracking condition of the heads is out-of-phase from the proper tracking condition by one track pitch is the same as when the proper tracking condition is present. As a result, the ATF servo control arrangement erroneously operates as if a proper tracking condition is present and attempts to lock up this tracking condition. But, if the rotary head reproducing apparatus is used in a video signal playback device having blanking circuitry which inhibits the production of an output video signal in the event that the reproduced video signal level is too low (as will arise due to azimuth loss when this out-of-phase tracking condition exists), the resultant video picture reproduced by such device will be blank. Likewise, and for the special condition wherein the video playback device is changed over from a "still" playback mode to a normal playback mode, the still video picture may be supplied as the output video signal if an out-of-phase lock-up mode is present to prevent a normal video signal from being reproduced with sufficient magnitude. Hence, even though a normal playback mode has been selected, the user may observe the continuance of the still picture mode. It is expected that, at its worst case, the out-of-phase lock-up mode may continue for about 1.5 seconds until a proper ATF operation is implemented. However, if a "blank" video picture or if a still video picture is observed, the user may erroneously believe that his video playback device has failed.

The present invention, now to be described, avoids this problem.

Figure 1:
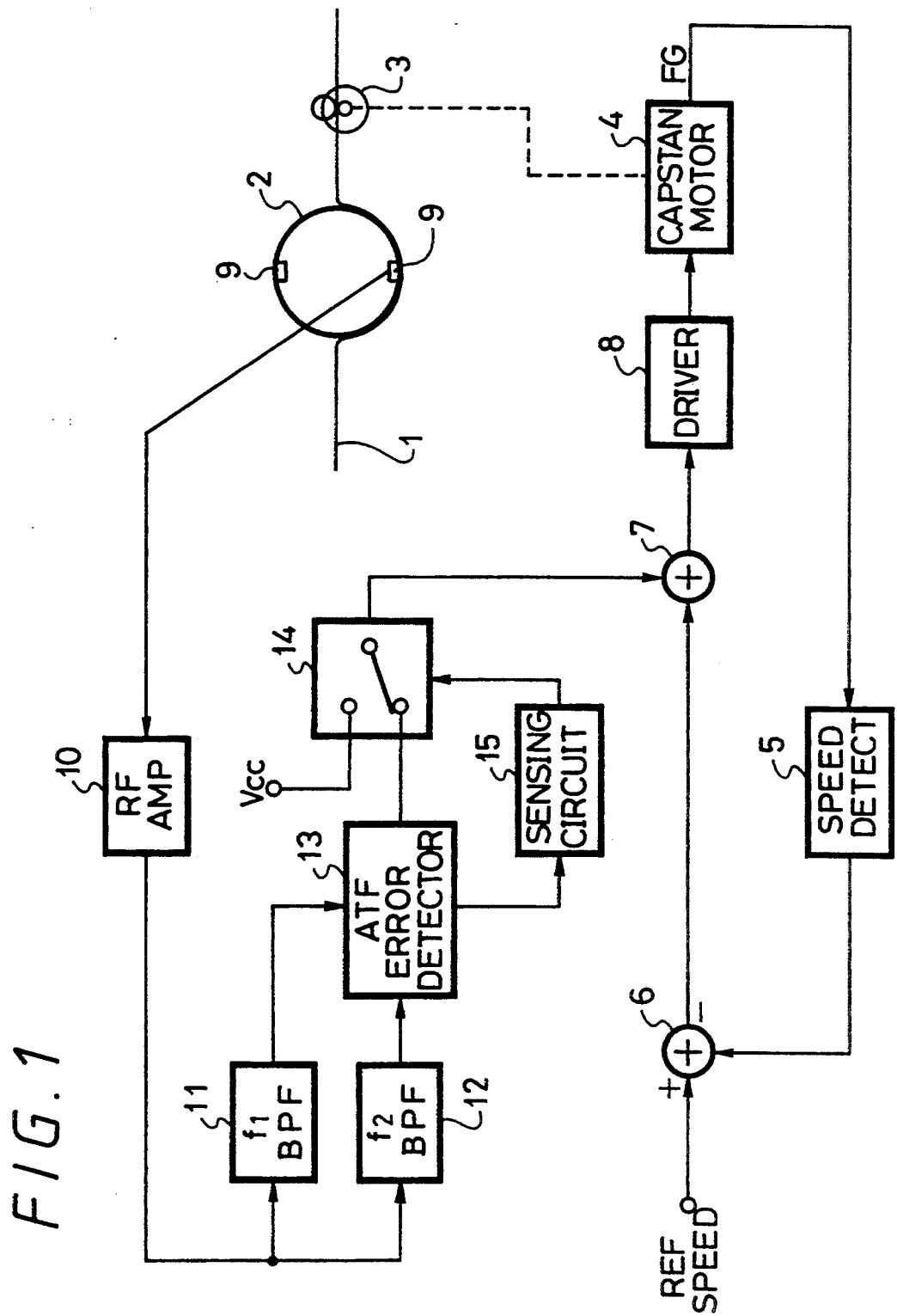
FIG. 1 is a block diagram of relevant portions of a servo controlled ATF arrangement in accordance with the present invention, incorporated into a rotary head reproducing apparatus.

Turning to FIG. 1, there is illustrated an ATF servo control arrangement which incorporates the circuitry shown in FIG. 5 and includes therein the improvement attained by the present invention. In the apparatus shown in FIG. 1, a pair of rotary heads 9 secured to a rotary drum 2 scans successive slant tracks across tape 1, the latter being advanced by a motor-driven capstan 3. For convenience, only one pair of heads is illustrated in FIG. 1; although it will be appreciated that such pair of heads may be replaced by a pair of head assemblies in which each assembly contains two or more heads. It will also be appreciated that yet another pair of heads or head assemblies angularly disposed by 90° from the illustrated heads 9 may be included in the rotary head reproducing apparatus. It will also be appreciated that tape 1 includes ATF areas disposed at the head-entering and/or head-leaving regions of the tape and in which are disposed the pattern or tracking control signals which have been discussed in detail hereinabove in conjunction with FIG. 4.

The servo control arrangement which is used to drive capstan 3 so as to advance tape 1 at a speed which provides proper tracking control is comprised of a pulse generator included in capstan motor 4 and adapted to produce pulses FG, the frequency of which represent the rotary speed of capstan 3 and, thus, the speed at which tape 1 moves, a speed detect circuit 5, a combining circuit 6, an adder 7 and a motor driver 8. Pulses FG derived from capstan motor 4 are coupled to speed detect circuit 5 which produces a signal, such as a voltage, representative of the actual speed of the capstan and, thus, of the tape. Combining circuit 6 functions as a comparator and may be constructed as a subtractor adapted to subtract the actual speed of tape 1, as represented by the output of speed detect circuit 5, from a reference speed supplied thereto by a suitable source (not shown). Thus, combining circuit 6 produces a speed error signal representing the difference between the actual speed of tape 1 and the desired, or reference speed. This error signal is supplied to driver 8 by way of adder 7, and depending upon the polarity and magnitude of the error signal, the operating speed of capstan motor 4 is adjusted accordingly. Hence, the illustrated servo arrangement is adapted to control capstan 3 such that tape 1 is driven at a speed equal to the reference speed. This reference speed may be selected by the user as a normal speed, a fast speed, a slow speed or any other speed for which desirable special effects are preferred.

Adder 7 is adapted to add to the speed error signal produced by combining circuit 6 the ATF error signal generated by the ATF error detector circuit shown in FIG. 5 and represented in FIG. 1 simply as ATF error detector 13. Although the ATF error detector 13 is illustrated in FIG. 1 as being supplied with pilot signals $f_1$ and $f_2$ extracted from the signals reproduced by heads 9 by way of bandpass filters 11 and 12, which reproduced signals are supplied to the bandpass filters by an RF amplifier 10, it will be appreciated that amplifier 10 and filters 11, 12 may be incorporated into ATF error detector 13 and may correspond to amplifier 51 and filters 52 and 57 shown in FIG. 5. Since the operation of the ATF error detector has been discussed in detail hereinabove, further description thereof is not provided.

In accordance with the present invention, a change-over switching circuit 14 is coupled to ATF error detector 13 and also is coupled to a source of speed determining signal $V_{cc}$ which, for example, may be a fixed DC voltage of predetermined magnitude. Change-over switch 14 operates as a selector circuit controlled by a sensing circuit 15, to be described, to supply to adder 7 either the ATF error signal produced by ATF error detector 13 or the speed determining signal $V_{cc}$.

Figure 2:
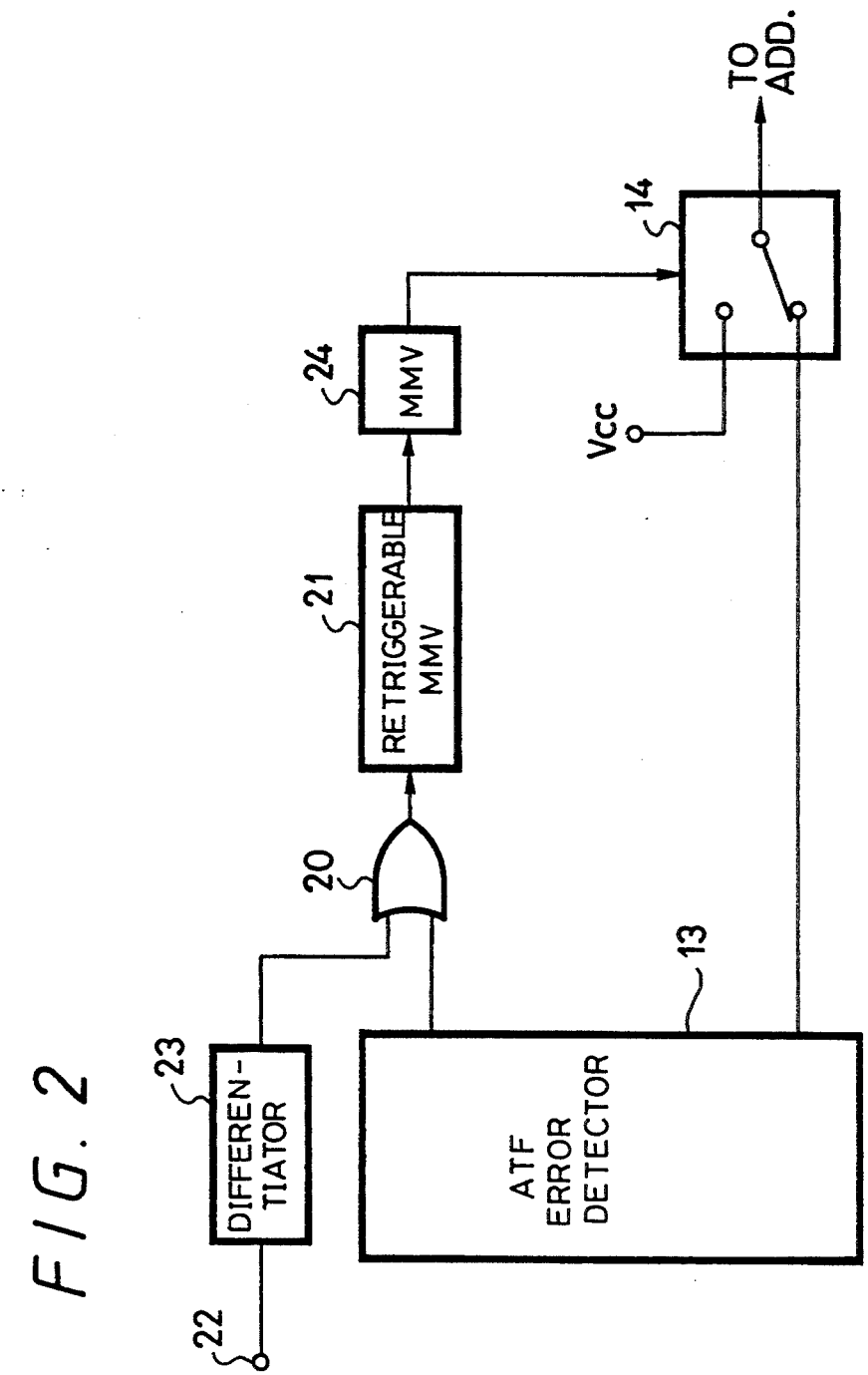
FIG. 2 is a block diagram of speed changing control circuitry in accordance with one embodiment of the present invention.

Sensing circuit 15, which is illustrated in greater detail in FIG. 2, is adapted to sense the absence of pilot signal $f_1$ for a predetermined time interval. From FIG. 5 it is seen that the presence or absence of pilot signal $f_1$ is determined by level comparison circuit 60; and sensing circuit 15 may be coupled to the output of this level comparison circuit. If the predetermined time interval passes without the sensing of pilot signal $f_1$, as will be indicated by the output of level comparison circuit 60, sensing circuit 15 controls selector circuit 14 to select the speed determining signal $V_{cc}$ for application to driver 8 by way of adder 7. In one embodiment, the speed determining signal $V_{cc}$ tends to increase the drive speed of capstan 3, thereby increasing the speed at which tape 1 is driven which, in turn, forces bandpass filter 57 to produce an output signal of sufficient magnitude to operate level comparison circuit 60, whereupon the ATF control circuit shown in FIG. 5 generates ATF error signals at output terminal 71. Alternatively, the speed determining signal $V_{cc}$ may exhibit a magnitude and/or polarity as to drive capstan motor 4 at a speed which reduces the speed of tape 1 but, nevertheless, has the same effect as increasing the tape speed, namely ATF error signals are forced to be produced at output terminal 71 of the ATF control circuit shown in FIG. 5.

In accordance with one embodiment, selector circuit 14 is controlled by sensing circuit 15 to couple speed determining signal $V_{cc}$ to adder 7 for a predetermined duration in the event that pilot signal $f_1$ is not detected. In another embodiment, the selector circuit is controlled to couple the speed determining signal to adder 7 until the pilot signal $f_1$ is detected.

In either embodiment, it is appreciated that, even if the level of the ATF error signal produced at output terminal 71 by the ATF control circuit shown in FIG. 5 is zero, as would result from an erroneous out-of-phase lock-up condition, this error condition exists for only a brief period of time before automatic track following recovers; and this brief period of time will be practically unnoticed by the user.

An example of one embodiment of sensing circuit 15 is illustrated in FIG. 2 as being comprised of monostable multivibrators 21 and 24 connected in cascade to supply a change-over control signal to selector circuit 14 in response to the output of, for example, level comparison circuit 60 included in ATF error detector 13. The sensing circuit shown in FIG. 2 also includes an OR gate 20 which supplies to multivibrator 21 either the output produced by level comparison circuit 60 or pulses produced by a differentiating circuit 23 in response to a speed-lock signal supplied to an input terminal 22 from the capstan speed servo circuit shown in FIG. 1. However, for the purpose of understanding the present invention, such speed-lock signal may be ignored.

Multivibrator 21 is a retriggerable monostable multivibrator circuit having a time-out period $T_2$ which is greater than the period $T_1$ corresponding to a rotational period of the heads. From the track pattern illustrated in FIG. 4, if pilot signal $f_1$ is recorded in alternate tracks and if only one pair of heads A and B is used to scan successive tracks, it is expected that, when the heads are in proper tracking alignment, pilot signal $f_1$ will be reproduced from, for example, the head-entering region, once during each 360° rotation of head drum 2. Since $T_2 > T_1$, multivibrator 21 is continually retriggered unless pilot signal $f_1$ is not recovered for more than one complete drum rotation. In the absence of retriggering, the output signal produced by multivibrator 21 undergoes a negative transition which triggers multivibrator 24 to produce an output pulse of duration $T_3$. This output pulse is supplied to selector circuit 14 as a change-over signal, whereby the selector circuit couples speed determining signal $V_{cc}$ to adder 7 for the duration $T_3$ of this change-over signal.

Figure 3:
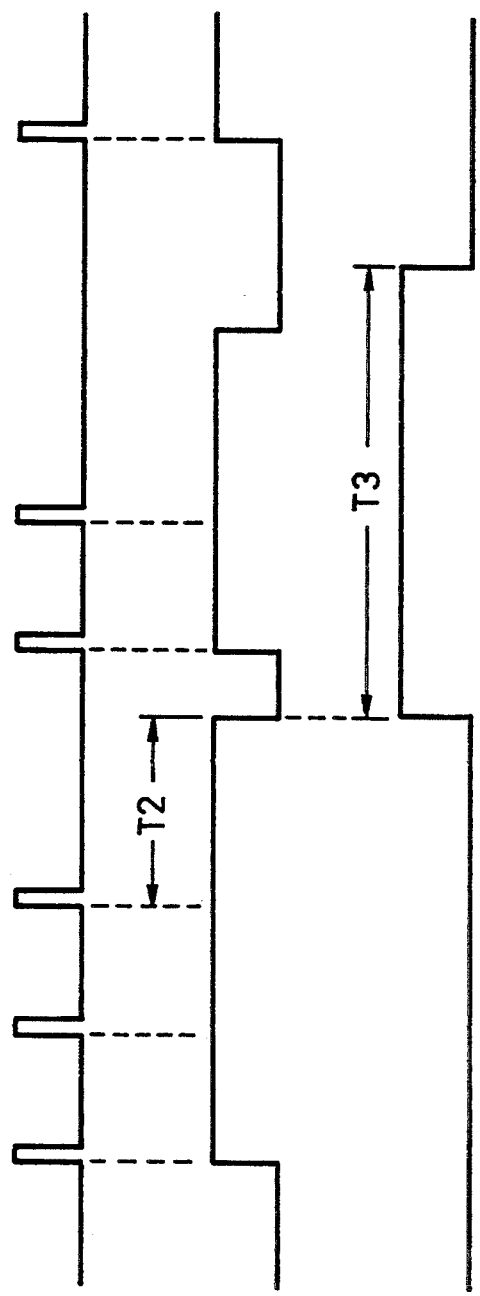
FIGS. 3A–3C are timing diagrams which are useful in understanding the operation of the embodiment shown in FIG. 2.

Referring to the timing diagrams illustrated in FIGS. 3A–3C, the output of level comparison circuit 60 is depicted in FIG. 3A, and it is seen that during normal ATF operation, the pilot signal $f_1$ is detected once during each rotary period $T_1$. The output of the level comparison circuit is illustrated as successive pulses; and each pulse is supplied to multivibrator 21 to retrigger the multivibrator to its quasi-stable state. As each successive pulse produced by the level comparison circuit is supplied to the multivibrator, the multivibrator remains in its quasi-stable state.

Now, let it be assumed that, because of out-of-phase lock-up, the level of the pilot signal $f_1$ reproduced from tracks A1, A2 falls below the threshold level of level comparison circuit 60. As a consequence thereof, the level comparison circuit does not supply a pulse to multivibrator 21 during a rotation of drum 2; whereupon multivibrator 21 is not retriggered. At the conclusion of its time-out period $T_2$, the multivibrator returns to its stable state, whereupon the output signal produced thereby undergoes a negative transition as shown in FIG. 3B. This negative transition triggers multivibrator 24, as shown in FIG. 3C, to supply a change-over signal of fixed duration $T_3$ to selector circuit 14. Accordingly, the speed determining signal $V_{cc}$ is supplied by selector circuit 14 to adder 7, thereby changing the speed at which capstan motor 4 is driven and at which tape 1 is advanced. As a result of this change in tape speed, the aforementioned lock-up condition is prevented and the track-following condition of the heads is altered so as to assure the presence of ATF error signals at output terminal 71 (FIG. 5).

At the completion of duration $T_3$, selector switch 14 once again couples output terminal 71 of ATF error detector 13 to adder 7, thereby resuming the ATF operation of the rotary head reproducing apparatus.

While the present invention has been particularly shown and described with reference to a preferred embodiment, it will be readily appreciated by those of ordinary skill in the art that various changes and modifications may be made. For example, the pulses supplied from level comparison circuit 60 to multivibrator 21 need not be limited solely to one such pulse for every rotation of drum 2. If desired, two or more such pulses may be supplied to the multivibrator for each rotation of the drum. Likewise, the time-out period of multivibrator 21 need not be limited to a duration greater than one but less than two rotations of drum 2. Rather, the predetermined time interval $T_2$ during which the absence of an output from the level comparison circuit is sensed may be two or more rotary periods of the drum. Still further, multivibrator 21 can be retriggered by signals normally produced during an ATF control operation and need not be retriggered solely by the output signals produced by level comparison circuit 60.

It is intended that the appended claims be interpreted to cover the embodiment specifically disclosed herein, those alternatives and modifications which have been discussed and all equivalents thereto.

What is claimed is:

1. Rotary head reproducing apparatus having at least first and second rotary heads for scanning successive tracks on a record medium movable at a controllable speed, which tracks contain a pattern of tracking control signals recorded therein and used for determining tracking errors to obtain tracking control of said heads with respect to said tracks, said apparatus comprising:
   servo control means responsive to said tracking control signals for carrying out a tracking control operation;
   tracking control signal detecting means for detecting at least one tracking control signal reproduced from a track by a rotary head;
   sense means for sensing if said at least one tracking control signal is not detected for a predetermined time interval; and
   speed changing means responsive to said sense means for changing the speed of said record medium to a predetermined speed to cause tracking errors when said at least one tracking control signal is not detected for said predetermined time interval.

2. The apparatus of claim 1 wherein said speed changing means includes change-over means for changing the speed of said record medium from said controllable speed to said predetermined speed and thereafter returning the speed of said record medium to said controllable speed.

3. The apparatus of claim 1 wherein said speed changing means includes timing means for changing the speed of said record medium to said predetermined speed for a selected duration.

4. The apparatus of claim 1 wherein said servo control means includes error signal generating means responsive to said tracking control signals for generating an error signal to drive said record medium at a speed which tends to minimize said error signal; and said speed changing means includes a source of speed determining signal, and means for selecting said error signal or said speed determining signal to drive said record medium.

5. The apparatus of claim 4 wherein said means for selecting is operative to select said speed determining signal for a selected duration when said at least one tracking control signal is not detected for said predetermined time interval and to select said error signal at the conclusion of said selected duration.

6. The apparatus of claim 1 wherein said predetermined speed is less than said controllable speed.

7. The apparatus of claim 1 wherein said predetermined speed is greater than said controllable speed.

8. The apparatus of claim 1 wherein said tracking control signal detecting means comprises threshold level means for determining if said at least one tracking control signal reproduced from a track exhibits a level greater than a preestablished threshold level.

9. The apparatus of claim 8 wherein said speed changing means comprises retriggerable monostable multivibrator means exhibiting a time-out period and retriggered when the level of said at least one tracking control signal exceeds said threshold level, said retriggerable monostable multivibrator means timing out when the level of said at least one tracking control signal is less than said threshold level to change the speed of said record medium to said predetermined speed.

10. The apparatus of claim 9 wherein said threshold level means supplies a trigger pulse to said monostable multivibrator means when the level of said at least one tracking control signal exceeds said threshold level.

11. The apparatus of claim 10 wherein said speed changing means includes a source of speed determining signal, switch means for coupling said speed determining signal to said servo control means, and switch control means responsive to the timing out of said monostable multivibrator means for operating said switch means to couple said speed determining signal to said servo control means.

12. The apparatus of claim 11 wherein said switch control means comprises pulse generating means responsive to the timing out of said monostable multivibrator means for generating a control pulse of selected duration to operate said switch means to couple said speed determining signal to said servo control means for said selected duration.

13. The apparatus of claim 1 wherein said tracking control signals comprise pilot signals recorded in assigned areas of said tracks.

14. The apparatus of claim 13 wherein said pilot signals admit of first and second frequencies, the first frequency pilot signal being recorded in alternate tracks and the second frequency pilot signal being recorded in alternate ones of remaining tracks.

15. The apparatus of claim 14 wherein the first frequency pilot signal has been recorded by a magnetic head having a first azimuth angle and the second frequency pilot has been recorded by a magnetic head having a second azimuth angle different from said first azimuth angle; and said sense means is operative to sense if the first frequency pilot signal is reproduced with a signal level less than a threshold level.

16. The apparatus of claim 15 wherein said tracking control signal detecting means includes a bandpass filter for detecting said first frequency pilot signal, said bandpass filter having an output coupled to said sense means.

* * * * *